United States Patent
Chendake (10) Patent No.: US 12,057,798 B2
(45) Date of Patent: Aug. 6, 2024

(54) ESTIMATING MOTOR SPEED AND POSITION

(71) Applicant: Infineon Technologies Austria AG, Villach (AT)

(72) Inventor: Vedant Sadashiv Chendake, Lengkong Tujoh (SG)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 29 days.

(21) Appl. No.: 17/357,455

(22) Filed: Jun. 24, 2021

(65) Prior Publication Data

US 2022/0416694 A1 Dec. 29, 2022

(51) Int. Cl.
| | |
|---|---|
| H02P 21/24 | (2016.01) |
| H02P 6/08 | (2016.01) |
| H02P 6/185 | (2016.01) |
| H02P 21/06 | (2016.01) |
| H02P 21/10 | (2016.01) |
| H02P 21/18 | (2016.01) |
| H02P 25/03 | (2016.01) |

(52) U.S. Cl.
CPC ............... *H02P 6/08* (2013.01); *H02P 6/185* (2013.01); *H02P 21/18* (2016.02)

(58) Field of Classification Search
CPC ............. H02P 6/08; H02P 21/18; H02P 6/185
USPC .................................................... 318/400.33
See application file for complete search history.

(56) References Cited

U.S. PATENT DOCUMENTS

| | | | | |
|---|---|---|---|---|
| 2008/0272731 | A1* | 11/2008 | Schulz | H02P 21/06 318/609 |
| 2010/0283414 | A1* | 11/2010 | Jun | H02P 6/17 318/400.02 |
| 2015/0084576 | A1* | 3/2015 | Magee | H02P 6/183 318/768 |
| 2016/0359442 | A1* | 12/2016 | Zhao | H02P 21/24 |
| 2017/0129340 | A1* | 5/2017 | Murthy | H02P 3/16 |
| 2018/0212541 | A1* | 7/2018 | Li | H02P 21/0014 |
| 2019/0028044 | A1* | 1/2019 | Ochs | H02P 6/08 |
| 2019/0389505 | A1* | 12/2019 | Pramod | H02P 6/08 |

FOREIGN PATENT DOCUMENTS

CN 101841297 A 9/2010

OTHER PUBLICATIONS

European Search Report from Corresponding European Patent Application No. 22180346.3, dated Nov. 17, 1 2022, 11 pages.

* cited by examiner

*Primary Examiner* — Gabriel Agared (74) *Attorney, Agent, or Firm* — Cooper Legal Group LLC (57) ABSTRACT

According to some embodiments, method for controlling a motor comprises generating a drive signal for the motor, the drive signal comprising a demand flux generating voltage parameter. A feedback torque generating current parameter and a feedback flux generating current parameter are determined based on a three-phase motor current measurement. A feedback flux generating voltage parameter is determined based on the feedback torque generating current parameter and the feedback flux generating current parameter. An estimated motor position and an estimated motor speed are determined based on the feedback flux generating voltage parameter and the demand flux generating voltage parameter. The drive signal is generated based on the estimated motor position and the estimated motor speed.

20 Claims, 5 Drawing Sheets

ESTIMATING MOTOR SPEED AND POSITION

TECHNICAL FIELD

The present disclosure relates generally to motor control.

BACKGROUND

Permanent Magnet Synchronous Motors (PMSMs) are employed in consumer and industrial motor applications due to their higher reliability and smaller size compared to other types of motors. To achieve high efficiency and low vibration and acoustic noise, Field-Oriented Control (FOC) techniques are often used in consumer and industrial PMSM control for fans, pumps, compressors, geared motors, and the like.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a method for controlling a motor is provided. The method includes generating a drive signal for the motor, the drive signal comprising a demand flux generating voltage parameter. A feedback torque generating current parameter and a feedback flux generating current parameter are determined based on a three-phase motor current measurement. A feedback flux generating voltage parameter is determined based on the feedback torque generating current parameter and the feedback flux generating current parameter. An estimated motor position and an estimated motor speed are determined based on the feedback flux generating voltage parameter and the demand flux generating voltage parameter. The drive signal is controlled based on the estimated motor position and the estimated motor speed.

According to some embodiments, an apparatus for controlling a motor is provided. The apparatus includes means for determining a feedback torque generating current parameter and a feedback flux generating current parameter based on a three-phase motor current measurement, means for determining a feedback flux generating voltage parameter based on the feedback torque generating current parameter and the feedback flux generating current parameter, means for determining an estimated motor position and an estimated motor speed based on the feedback flux generating voltage parameter and a demand flux generating voltage parameter, and means for generating the drive signal for the motor based on the estimated motor position and the estimated motor speed.

According to some embodiments, a motor controller is provided. The motor controller includes a feedback unit configured to receive a three-phase motor current measurement and transform the three-phase motor current measurement to generate a feedback torque generating current parameter and a feedback flux generating current parameter. A first controller is configured to generate a demand torque generating current parameter based on a demand speed parameter and an estimated motor speed. A second controller is configured to generate a demand torque generating voltage parameter based on the demand torque generating current parameter and the feedback torque generating current parameter. An observer unit is configured to determine a feedback flux generating voltage parameter based on the feedback torque generating current parameter and the feedback flux generating current parameter and determine an estimated motor position and the estimated motor speed based on the feedback flux generating voltage parameter and the demand flux generating voltage parameter.

According to some embodiments, a method for controlling a motor is provided. The method includes receiving a three-phase motor current measurement. The three-phase motor current measurement is transformed to generate a feedback torque generating current parameter and a feedback flux generating current parameter. An estimated motor speed parameter and an estimated motor position parameter are generated based on the feedback torque generating current parameter and the feedback flux generating current parameter. A drive signal is generated for the motor based on a demand speed parameter and the estimated motor speed parameter. The drive signal is transformed based on the estimated motor position parameter to generate a stationary frame drive signal. A pulse width modulator coupled to the motor is controlled based on the stationary frame drive signal.

According to some embodiments, an apparatus for controlling a motor is provided. The apparatus includes means for receiving a three-phase motor current measurement, means for transforming the three-phase motor current measurement to generate a feedback torque generating current parameter and a feedback flux generating current parameter, means for generating an estimated motor speed parameter and an estimated motor position parameter based on the feedback torque generating current parameter and the feedback flux generating current parameter, means for generating a drive signal for the motor based on a demand speed parameter and the estimated motor speed parameter, means for transforming the drive signal based on the estimated motor position parameter to generate a stationary frame drive signal, and means for generating a pulse width modulator coupled to the motor based on the stationary frame drive signal.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In addition to motor control functions, the processing time of a microcontroller used in a motor controller is also shared to provide user interfaces and other functionality. Providing motor control without computationally intensive techniques, such as transforms requiring quadric equations, allows increased functionality to be provided in systems with reduced complexity, lower cost microcontrollers.

Field-Oriented Control (FOC) is a method of variable speed control for three-phase alternating current (AC) electric motors to improve power efficiency with fast control response over a full range of motor speeds. Various implementations of structures, components, and techniques for providing control of three-phase AC motors are discussed herein. Structures, components, and techniques are discussed with reference to example three-phase Permanent Magnet Synchronous Motor (PMSM) devices and control systems. However, this application is not intended to be limiting, and is for ease of discussion and illustrative convenience. The techniques and devices discussed may be applied to other motor designs, control structures, and the like (e.g., single-phase and three-phase variable frequency drives, digital phase converters, three-phase and single-phase motors, induction motors, regenerative drives, etc.), and remain within the scope of the disclosure.

Figure 1:
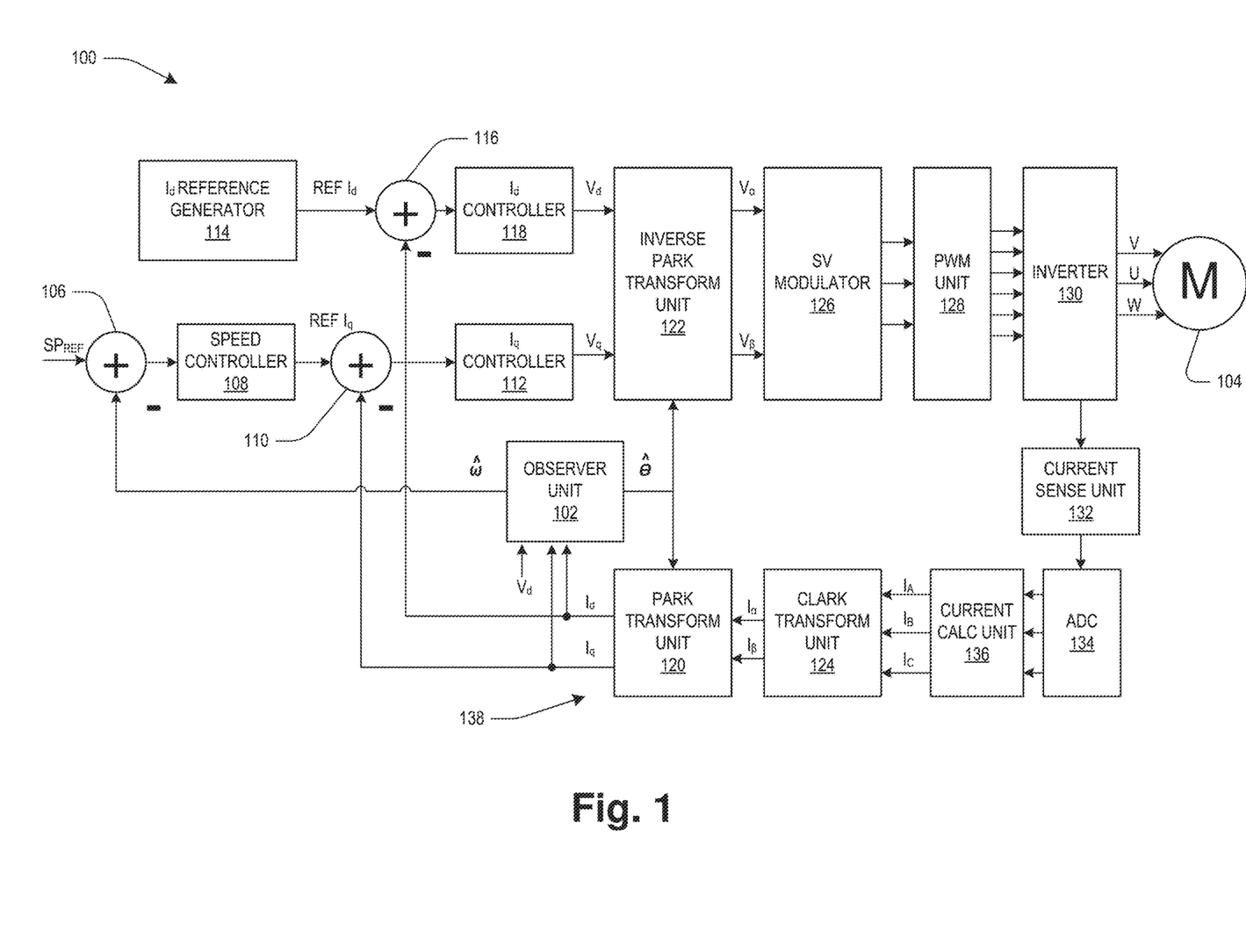
FIG. 1 is a schematic diagram of a motor controller, according to some embodiments.

FIG. 1 is a schematic diagram of a motor controller 100, according to some embodiments. The motor controller 100 shown in FIG. 1 is a sensorless controller that uses an observer unit 102 to estimate a rotor position, $\hat{\theta}$, and a rotor speed, $\hat{\omega}$, to support FOC techniques for controlling a motor 104. Rotor speed is indicative of motor speed. To implement FOC control, the motor controller 100 uses a Park transform to convert between a D-Q rotor fixed reference frame defined by a torque generating component, Q, and a flux generating component, D, and an α-β stationary reference frame and a Clarke transform to convert between a three-phase reference frame defined by V, U, and W components and the α-β stationary reference frame. The α-β stationary reference frame signals are sinusoidal signals at steady state, and the D-Q rotor fixed reference frame signals are nearly constant at steady state. Park transforms, inverse Park transforms, and Clarke transforms are known in the motor control art and are not described in greater detail herein.

In the three-phase reference frame, the U, V, and W components are separated by 120° and are stationary. In the α-β stationary reference frame, the components are electrically orthogonal and stationary. In the D-Q rotor fixed reference frame, the components are electrically orthogonal and rotating. For purposes of this description it is assumed that the motor 104 rotates in a positive direction, i.e., the counterclockwise direction, so the angles and angular speeds are positive numbers. The signs of the angles and angular speeds may be changed for a motor 104 that rotates in the negative direction, i.e., the clockwise direction. Coordinate systems may be referenced to the stator and/or the rotor of the motor 104. For example, the D-Q rotor fixed reference frame is fixed to the rotor and the components of the D-Q coordinate system rotate together. The direct axis of the D-Q rotor fixed reference frame is oriented in the direction from the rotor permanent magnet south pole (S) to north pole (N). The quadrature axis of the D-Q rotor fixed reference frame is perpendicular to the rotor flux (e.g., to the rotor).

The three-phase sinusoidal currents $I_U$, $I_V$, and $I_W$ of the motor stator windings are separated by 120° and generate three non-rotating, pulsating magnetic fields in the U, V, and W directions, respectively, resulting in a rotating magnetic field (stator flux space vector). Vector addition of $I_U$, $I_V$, and $I_W$ gives a current space vector. The magnitude of the current space vector may be scaled up or down with no change of direction for a motor rotating at speed, $\omega_i$.

In the stationary α-β reference frame, the rotating stator flux space vector represents the rotating stator magnetic flux. Vector addition of the three-phase 120° separated stator phase voltages $V_U$, $V_V$, and $V_W$ defines a rotating voltage space vector. A rotating rotor permanent magnet generates a rotating rotor magnetic flux space vector. The magnitudes and directions of the above-mentioned rotating space vectors can be represented by radial coordinates and polar angles in polar coordinate systems. Techniques for transforming between the reference frames are known in the art.

Referring to FIG. 1, a reference speed, $SP_{REF}$, representing a desired rotational speed for the motor 104, is received as an input and is provided to an adder 106 which also receives rotor speed feedback from the observer unit 102 to generate an error signal for input to a speed controller 108. In some embodiments, the speed controller 108 is a proportional-integral (PI) controller that operates to drive its input error signal to zero. An output of the speed controller 108 is provided to an adder 110 that also receives a feedback torque generating current parameter (10. The adder 110 provides an input signal to an $I_q$ controller 112. In some embodiments, the $I_q$ controller 112 is a proportional-integral (PI) controller that operates to drive its input signal, which represents an error signal to zero.

A reference generator 114 provides a reference flux generating current parameter ($I_d$) as an input to an adder 116. The adder 116 also receives a feedback flux generating current parameter ($I_d$) and provides an error signal input to an $I_q$ controller 118. In some embodiments, the $I_d$ controller 118 is a proportional-integral (PI) controller that operates to drive its error input signal to zero. The $I_q$ controller 112 outputs a demand torque generating voltage parameter, $V_q$, and the $I_q$ controller 118 outputs a demand flux generating voltage parameter, Va. In some embodiments, the flux generating component $I_d$ is controlled to zero. In some embodiments, the flux generating component $I_d$ is controlled using a negative reference value to implement flux-weakening control to extend the operating speed range of the motor 104. In some embodiments, the flux generating component $I_d$ is controlled using a positive reference value to implement flux-boosting control.

The motor controller 100 comprises a Park transform unit 120, an inverse Park transform unit 122, and a Clarke transform unit 124 to convert between reference frames. The Park transform unit 120 transforms the D-Q rotor fixed reference frame to the α-β stationary reference frame. The inverse Park transform unit 122 transforms the α-β stationary reference frame to the D-Q rotor fixed reference frame.

The Clarke transform unit 124 transforms the three-phase reference frame to the α-β stationary reference frame.

The inverse Park transform unit 122 receives the demand torque generating voltage parameter, $V_q$, from the $I_q$ controller 112 and the demand flux generating voltage parameter, $V_d$, from the $I_d$ controller 118 and generates stationary frame voltage parameters, $V_\alpha$, $V_\beta$, as inputs to a space vector modulator 126. The amplitude and angle of the voltage vector defined by $V_\alpha$ and $V_\beta$ provide a reference voltage for the space vector modulator 126 for controlling a pulse width modulation (PWM) unit 128 to generate three-phase sinusoidal waveform output signals to drive an inverter 130. The output signals of the inverter 130 drive the phases of the motor 104. In some embodiments, the inverter 130 comprises a three-phase two-level voltage inverter.

A current sense unit 132 senses phase currents of the motor 104. In some embodiments, the current sense unit 132 comprises three shunt resistors associated with the three legs of the inverter 130 to sense the current of each phase of the motor 104. In some embodiments, two shunt resistors are used to sense the current of two phases of the motor 104. The current from the third phase of the motor 104 may be calculated based on the relationship $I_U+I_V+I_W=0$. In some embodiments, a single shunt resistor is inserted into to a DC link of the inverter 130 to sense a DC link current, and a three-phase current reconstruction is used to obtain the current information for each phase of the motor 104.

An analog-to-digital converter (ADC) 134 receives the sensed voltages from the current sense unit 132 to generate digital inputs for a current calculation unit 136. The current calculation unit 136 generates phase current measurement parameters, $I_U$, $I_V$, and $I_W$. The phase current measurement parameters are provided to the Clarke transform unit 124 to generate α-β stationary reference frame feedback current parameters, $I_\alpha$, $I_\beta$. The stationary reference frame feedback current parameters are provided to the Park transform unit 120 to generate a feedback torque generating current parameter, $I_q$, and a feedback flux generating current parameter, $I_d$. The current calculation unit 136, Clarke transform unit 124, and Park transform unit 120 comprise a feedback unit 138 for generating the feedback torque generating current parameter, $I_q$, and the feedback flux generating current parameter, $I_d$.

The observer unit 102 estimates the rotor position, $\hat{\theta}$, and the rotor speed, $\hat{\omega}$, using data in the D-Q rotor fixed reference frame, thereby avoiding the need to perform additional computationally intensive reference frame transformations. In a Surface Permanent Magnet Synchronous Motor (SPMSM) efficiency is increased by controlling the flux generating current, $I_d$, to zero. A feedback flux generating voltage parameter, $V_{df}$, may be computed from the motor inductance, $L_Q$, electric speed (ω), and torque producing current, $I_q$. In a flux weakening operating mode when flux generating current $I_d<0$, the rotor position and speed may be estimated based on the motor inductance, $L_Q$, motor resistance, R, electric speed (ω), torque generating current, $I_q$, and flux generating current, $I_d$.

Figure 2:
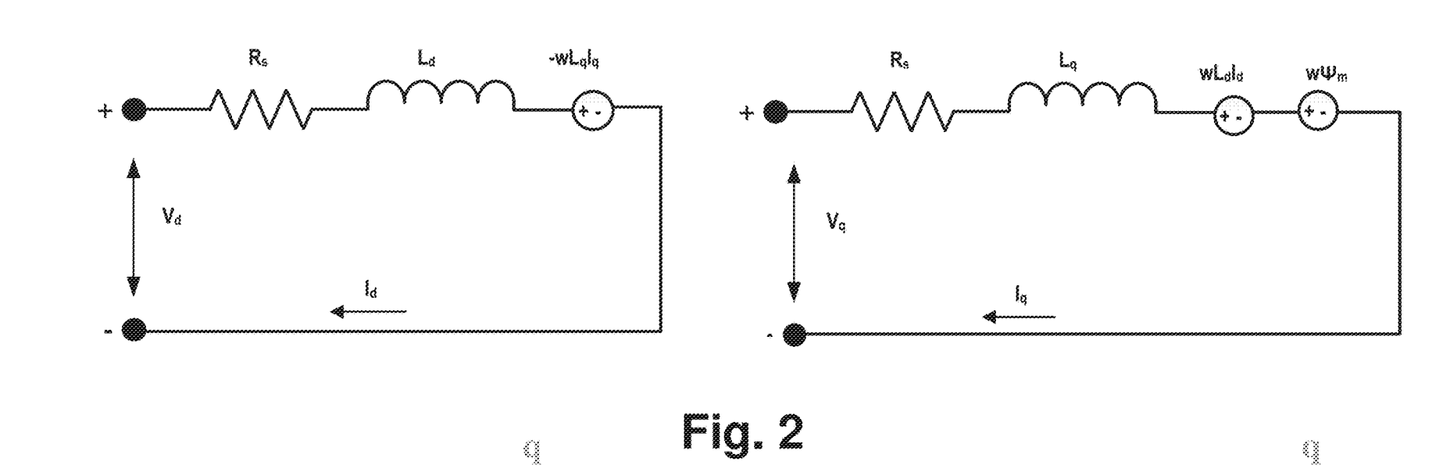
FIG. 2 is a diagram of equivalent circuits for the D-Q rotor-fixed reference frame, according to some embodiments.

FIG. 2 is a diagram illustrating equivalent circuits for the D-Q rotor-fixed reference frame, according to some embodiments. The dynamic D-Q axis voltage equations for a PMSM are:

$$V_d = R_s I_d - \omega L_q I_q + L_d \frac{dI_d}{dt} \text{ and} \quad (1)$$

$$V_q = R_s I_q + \omega L_d I_d + L_q \frac{dI_q}{dt} + \omega \Psi_m, \quad (2)$$

where:
$V_d$—Flux generating voltage
$V_q$—Torque generating voltage
$R_s$—Motor phase resistance
$L_d$—Synchronous inductance of motor winding in d-axis
$L_q$—Synchronous inductance of motor winding in q-axis
$I_q$—Torque generating current
$I_d$—Flux generating current
$\Psi_m$—Permanent magnet flux linkage In some embodiments, the motor phase resistance parameter, synchronous inductance parameters, and the permanent magnet flux linkage represent motor specification sheet reference values rather than dynamically determined parameters. Since $I_d$ and $I_q$ are DC values, their derivatives become negligible under steady-state, and therefore, equations 1 and 2 can be simplified as:

$$V_d = R_s I_d - \omega L_q I_q \text{ and} \quad (3)$$

$$V_q = R_s I_q + \omega L_d I_d + \omega \Psi_m \quad (4)$$

The PMSM electromagnetic torque equation is:

$$T_e = \frac{3}{2} P(\Psi_m I_q + (L_d - L_q) I_d I_q), \quad (5)$$

where P is the number of permanent magnet poles.

For a SPMSM, $L_q=L_d$ and only reaction torque contributes to the electromagnetic torque. Equation (5) can be simplified for SPMSM as:

$$T_e = \frac{3}{2} P \Psi_m I_q. \quad (6)$$

From equation (6) it is evident that to increase efficiency of an SPMSM the flux generating current component can be set to zero since the flux generating current does not contribute to torque.

Setting $I_d$ to zero allows Equation 3 to be simplified to:

$$V_d = -\omega L_q I_q \quad (7)$$

Figure 3:
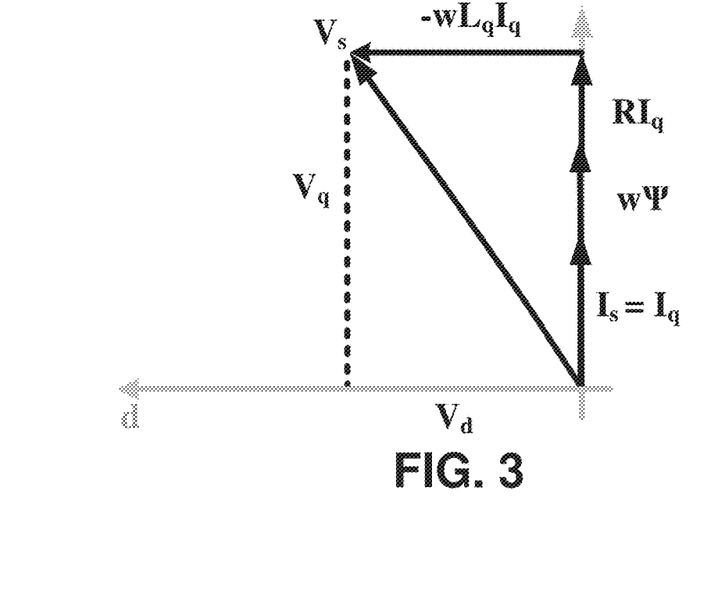
FIG. 3 is a diagram of a phasor representation of a permanent magnet synchronous motor with the flux generating current set to zero, according to some embodiments.

FIG. 3 is a diagram of a phasor representation of a PMSM with the flux generating current, $I_d$, set to zero, according to some embodiments. In the phasor diagram of FIG. 3:

$$V_s = \sqrt{V_d^2 + V_q^2} \text{ and} \quad (8)$$

$$I_s = \sqrt{I_d^2 + I_q^2}. \quad (9)$$

In equation (7) the only unknown parameter is the rotor speed, ω. The rotor angle can be calculated from the estimated rotor speed, $\hat{\omega}$. Equation (7) is independent of motor resistance, so rotor position and speed estimation are not affected due to changes in motor resistance as an effect of motor temperature rise. The rotor position, $\hat{\theta}$, is calculated by integrating the speed according to:

$$\hat{\theta} = \int \hat{\omega} dt. \quad (10)$$

Direct flux weakening is generally not possible with permanent magnet motors, however, similar effects can be achieved by extending the current vector beyond 90° to the rotor flux axis by introducing a negative flux generating current component, i.e., $I_d<0$.

An interior permanent magnet synchronous motor (IPMSM) is magnetically salient ($L_q > L_d$). From motor torque equation (5), it is evident that the higher the ratio between $L_q$ and $L_d$, the higher the amount of reluctance torque exists. A Maximum Torque Per Ampere (MTPA) algorithm may be used to utilize reluctance torque to select the magnitude of the negative value for $I_d$.

Figure 4:
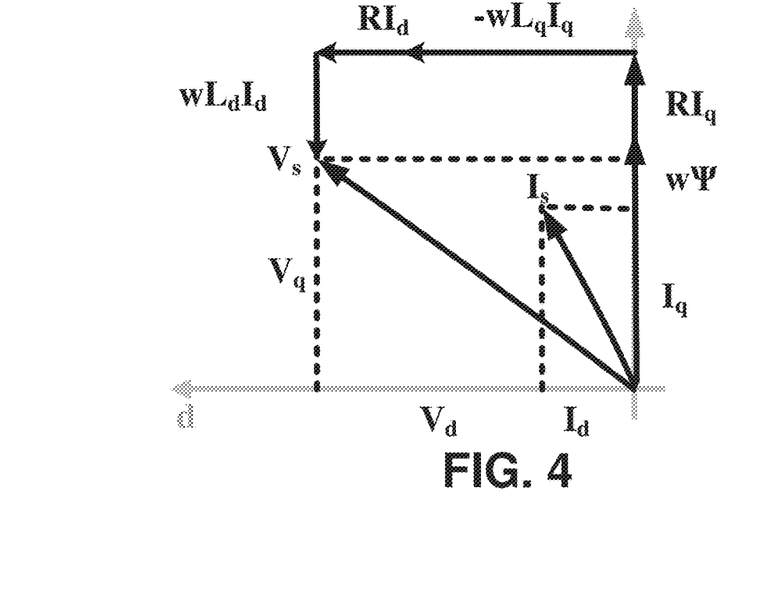
FIG. 4 is a diagram of a phasor representation of a permanent magnet synchronous motor with the flux generating current set to a negative value to implement flu weakening control, according to some embodiments.

FIG. 4 is a diagram of a phasor representation of a PMSM with the flux generating current, Ia, set at a negative value to implement flux weakening control, according to some embodiments. It is apparent from FIG. 4 that the flux generating voltage, $V_d$, is dependent on motor resistance, so the rotor speed estimation described by Equation 7 cannot be used. However, equation (3) may be used to estimate the rotor speed, and equation 10 may be used to estimate the rotor position. In general, PMSM motor parameters are not constant during operation. For example, the actual motor stator resistance varies significantly from the value specified by the motor data sheet depending temperature. Motor resistance variation due to temperature change can degrade the rotor estimation accuracy and aggravate control performance, especially at low speed.

Below nominal speed, flux generating current is controlled to zero for higher efficiency. Above nominal speed in the flux weakening region with a negative flux generating current, Ia, the inductor voltage drop is much higher than the resistance voltage drop for Va. Hence the change in motor resistance due to temperature rise does not have a significant impact on the rotor position estimation.

$$\omega L_q I_q \gg R_s I_d. \quad (11)$$

Figure 5:
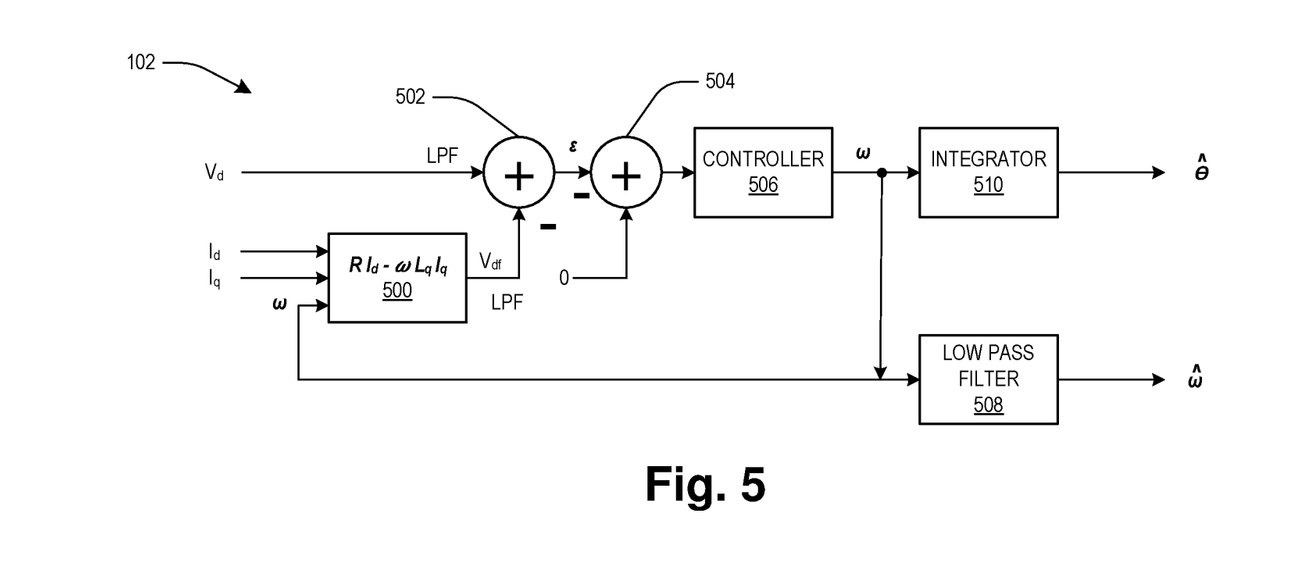
FIG. 5 is a schematic diagram of an embodiment of an observer unit, according to some embodiments.

FIG. 5 is a schematic diagram of an embodiment of the observer unit 102, according to some embodiments. The observer unit 102 comprises a calculation unit 500 that determines a feedback flux generating voltage parameter, $V_{df} = R\,I_d - \omega L_q\,I_q$. The motor resistance parameter, R, and the motor inductance parameter, $L_q$, represent motor data sheet values. An adder 502 subtracts the feedback flux generating voltage parameter, $V_{df}$, from the demand flux generating voltage parameter, $V_d$, calculated by the $I_d$ controller 118 to generate a flux generating voltage error parameter, E. An adder 504 generates an error signal for a controller 506. The controller 506 controls the error signal, E to the zero reference provided to the adder 504.

The observer unit 102 uses the controller 506 to implement a phase locked loop (PLL) to estimate the rotor speed, $\hat{\omega}$. In some embodiments, the controller 506 is a proportional-integral controller. Other structures and configurations of the controller 506 are within the scope of the present disclosure. For example, a hysteresis controller or a sliding mode controller may be used. The calculation unit 500 receives the estimated rotor speed from the previous iteration of the PLL to estimate the current rotor speed. A low pass filter 508 receives the output from the controller 506 to remove high-frequency noise to reduce erroneous estimation due to noise. An integrator unit 510 integrates the rotor speed, $\hat{\omega}$, output by the controller 506 to estimate the rotor position, $\hat{\theta}$. The observer unit 102 estimates the rotor speed and the rotor position within one electrical cycle in a closed loop.

The observer unit 102 of FIG. 5 supports varying controlled levels of the flux generating current, $I_d$, such as $I_d=0$, $I_d<0$ (flux weakening), or $I_d>0$ (flux boosting), for SPMSM and MTPA control in the case of IPMSM control. Since motor resistance does not significantly impact the rotor speed estimation, the nominal motor resistance may be used, obviating the need to dynamically estimate resistance changes resulting from temperature.

Furthermore, some of the disclosed techniques may be readily implemented in software using object or object-oriented software development environments that provide portable source code that can be used on a variety of computer or workstation platforms. Alternatively, the disclosed techniques and/or arrangements may be implemented partially or fully in hardware using standard logic circuits or VLSI design. In some embodiments, the motor 104, inverter 130, ADC 134, and the current sense unit 132 are hardware-implemented and the remaining units in FIG. 1 are software implemented. However, other combinations of hardware, firmware, or software are contemplated.

Moreover, the disclosed procedures may be readily implemented in software that can be stored on a computer-readable storage medium (such as a memory storage device), executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

Figure 6:
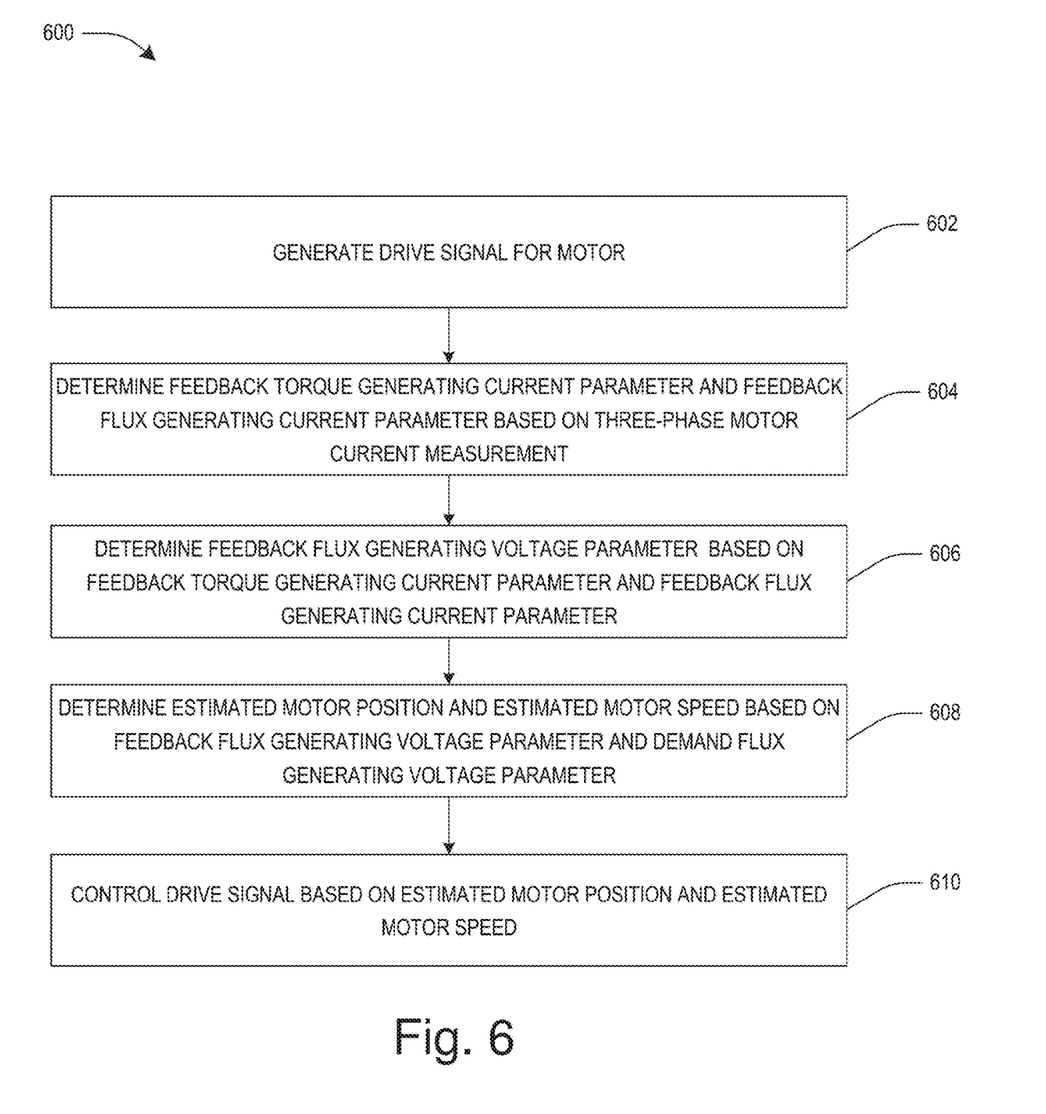
FIG. 6 illustrates a method of controlling a motor, according to some embodiments.

FIG. 6 illustrates a method 600 for controlling a motor. At 602, a drive signal is generated for the motor. The drive signal comprises a demand torque generating voltage parameter. At 604, a feedback torque generating current parameter and a feedback flux generating current parameter are generated based on a three-phase motor current measurement. At 606, a feedback flux generating voltage parameter is generated based on the feedback torque generating current parameter and the feedback flux generating current parameter. At 608, an estimated motor position and an estimated motor speed are determined based on the feedback flux generating voltage parameter and the demand flux generating voltage parameter. At 610, the drive signal is controlled based on the estimated motor position and the estimated motor speed.

Figure 7:
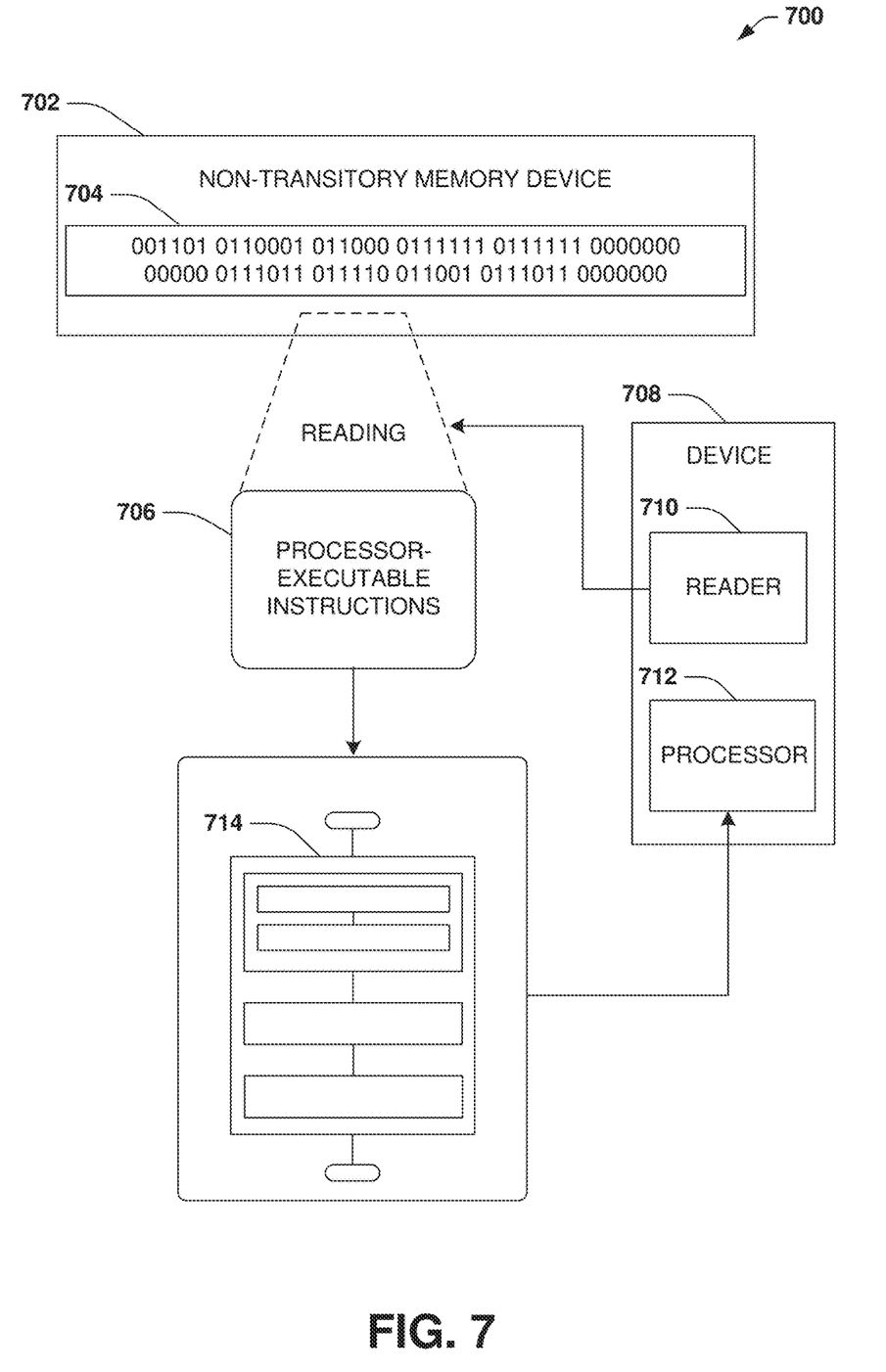
FIG. 7 illustrates an exemplary computer-readable medium, according to some embodiments.

FIG. 7 illustrates an exemplary embodiment 700 of a computer-readable medium 702, according to some embodiments. One or more embodiments involve a computer-readable medium comprising processor-executable instructions configured to implement one or more of the techniques presented herein. The embodiment 700 comprises a non-transitory computer-readable medium 702 (e.g., a CD-R, DVD-R, flash drive, a platter of a hard disk drive, etc.), on which is encoded computer-readable data 704. This computer-readable data 704 in turn comprises a set of processor-executable computer instructions 706 that, when executed by a computing device 708 including a reader 710 for reading the processor-executable computer instructions 706 and a processor 712 for executing the processor-executable computer instructions 706, are configured to facilitate operations according to one or more of the principles set forth herein. In some embodiments, the processor-executable computer instructions 706, when executed, are configured to facilitate performance of a method 714, such as at least some of the aforementioned method(s). In some embodiments, the processor-executable computer instructions 706, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

According to some embodiments, method for controlling a motor includes generating a drive signal for the motor, the drive signal including a demand flux generating voltage parameter. A feedback torque generating current parameter and a feedback flux generating current parameter are determined based on a three-phase motor current measurement. A feedback flux generating voltage parameter is determined based on the feedback torque generating current parameter and the feedback flux generating current parameter. An estimated motor position and an estimated motor speed are determined based on the feedback flux generating voltage parameter and the demand flux generating voltage parameter. The drive signal is controlled based on the estimated motor position and the estimated motor speed.

According to some embodiments, generating the drive signal includes generating the demand torque generating voltage parameter based on a demand speed parameter and the feedback torque generating current parameter, and generating the drive signal based on the demand torque generating voltage parameter.

According to some embodiments, generating the drive signal includes generating the demand flux generating voltage parameter based on a reference flux generating current parameter and the feedback flux generating current parameter.

According to some embodiments, the reference flux generating current parameter is less than zero.

According to some embodiments, the method includes transforming the drive signal to generate a stationary frame drive signal based on the estimated motor position.

According to some embodiments, determining the feedback flux generating voltage parameter includes subtracting a previous value of the estimated motor speed multiplied by a motor inductance parameter and the feedback torque generating current parameter from the feedback flux generating current parameter multiplied by a motor resistance parameter to determine the feedback flux generating voltage parameter.

According to some embodiments, determining the estimated motor speed includes subtracting the feedback flux generating voltage parameter from a demand flux generating voltage parameter to generate an error signal and determining the estimated motor speed based on the error signal using a proportional-integral controller.

According to some embodiments, determining the estimated motor position includes integrating the estimated motor speed to determine the estimated motor position.

According to some embodiments, a motor controller is provided. The motor controller includes a feedback unit configured to receive a three-phase motor current measurement and transform the three-phase motor current measurement to generate a feedback torque generating current parameter and a feedback flux generating current parameter. A first controller is configured to generate a demand torque generating current parameter based on a demand speed parameter and an estimated motor speed. A second controller is configured to generate a demand torque generating voltage parameter based on the demand torque generating current parameter and the feedback torque generating current parameter. An observer unit is configured to determine a feedback flux generating voltage parameter based on the feedback torque generating current parameter and the feedback flux generating current parameter and determine an estimated motor position and the estimated motor speed based on the feedback flux generating voltage parameter and a demand flux generating voltage parameter.

According to some embodiments, a third controller is configured to generate the demand flux generating voltage parameter based on a reference flux generating current parameter and the feedback flux generating current parameter.

According to some embodiments, a transform unit is configured to transform the demand torque generating voltage parameter and the demand flux generating voltage parameter to generate a stationary frame drive signal based on the estimated motor position.

According to some embodiments, the reference flux generating current parameter is less than zero.

According to some embodiments, the observer unit is configured to subtract a previous value of the estimated motor speed multiplied by a motor inductance parameter and the feedback torque generating current parameter from the feedback flux generating current parameter multiplied by a motor resistance parameter to determine the feedback flux generating voltage parameter.

According to some embodiments, the observer unit is configured to subtract the feedback flux generating voltage parameter from a demand flux generating voltage parameter to generate an error signal, and the observer unit includes a controller configured to determine the estimated motor speed based on the error signal.

According to some embodiments, the controller includes a proportional-integral controller.

According to some embodiments, the observer unit includes an integrator configured to integrate the estimated motor speed to determine the estimated motor position.

According to some embodiments, the observer unit is configured to subtract the feedback flux generating voltage parameter from a demand flux generating voltage parameter to generate an error signal, and the observer unit includes a proportional-integral controller configured to generate the estimated motor speed based on the error signal.

According to some embodiments, a method for controlling a motor includes receiving a three-phase motor current measurement. The three-phase motor current measurement is transformed to generate a feedback torque generating current parameter and a feedback flux generating current parameter. An estimated motor speed parameter and an estimated motor position parameter are generated based on the feedback torque generating current parameter and the feedback flux generating current parameter. A drive signal is generated for the motor based on a demand speed parameter and the estimated motor speed parameter. The drive signal is transformed based on the estimated motor position parameter to generate a stationary frame drive signal. A pulse width modulator coupled to the motor is controlled based on the stationary frame drive signal.

According to some embodiments, generating the drive signal includes generating a demand torque generating current parameter based on the demand speed parameter and the estimated motor speed parameter, generating a demand torque generating voltage parameter based on the demand torque generating current parameter and the feedback torque generating current parameter, generating a demand flux generating voltage parameter based on a reference flux generating current parameter and the feedback flux generating current parameter, and generating the drive signal based on at least one of the demand torque generating voltage parameter or the demand flux generating voltage parameter.

According to some embodiments, the reference flux generating current parameter is less than zero.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally to be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for controlling a motor comprising:
   generating a drive signal for the motor, the drive signal comprising a demand flux generating voltage parameter;
   determining a feedback torque generating current parameter and a feedback flux generating current parameter based on a three-phase motor current measurement;
   determining a feedback flux generating voltage parameter using an equation comprising the feedback torque generating current parameter and the feedback flux generating current parameter as operands;
   determining an estimated motor position and an estimated motor speed based on the feedback flux generating voltage parameter and the demand flux generating voltage parameter; and
   generating the drive signal based on the estimated motor position and the estimated motor speed.

2. The method of claim 1, wherein generating the drive signal comprises:
   generating a demand torque generating voltage parameter based on a demand speed parameter and the feedback torque generating current parameter; and
   generating the drive signal based on the demand torque generating voltage parameter.

3. The method of claim 1, wherein generating the drive signal comprises:
   generating the demand flux generating voltage parameter based on a reference flux generating current parameter and the feedback flux generating current parameter.

4. The method of claim 3, wherein:
   the reference flux generating current parameter is less than zero.

5. The method of claim 1, comprising:
   transforming the drive signal to generate a stationary frame drive signal based on the estimated motor position.

6. The method of claim 1, wherein determining the feedback flux generating voltage parameter comprises:
   subtracting a previous value of the estimated motor speed multiplied by a motor inductance parameter and the feedback torque generating current parameter from the feedback flux generating current parameter multiplied by a motor resistance parameter to determine the feedback flux generating voltage parameter.

7. The method of claim 1, wherein determining the estimated motor speed comprises:
   subtracting the feedback flux generating voltage parameter from a demand flux generating voltage parameter to generate an error signal; and
   determining the estimated motor speed based on the error signal using a proportional-integral controller.

8. The method of claim 1, wherein determining the estimated motor position comprises:
   integrating the estimated motor speed to determine the estimated motor position.

9. A motor controller comprising:
   a feedback unit configured to receive a three-phase motor current measurement and transform the three-phase motor current measurement to generate a feedback torque generating current parameter and a feedback flux generating current parameter;
   a first controller configured to generate a demand torque generating current parameter based on a demand speed parameter and an estimated motor speed;
   a second controller configured to generate a demand torque generating voltage parameter based on the demand torque generating current parameter and the feedback torque generating current parameter; and an observer unit configured to determine a feedback flux generating voltage parameter using an equation comprising the feedback torque generating current parameter and the feedback flux generating current parameter as operands and determine an estimated motor position and the estimated motor speed based on the feedback flux generating voltage parameter and a demand flux generating voltage parameter.

10. The motor controller of claim 9, comprising:

a third controller configured to generate the demand flux generating voltage parameter based on a reference flux generating current parameter and the feedback flux generating current parameter.

11. The motor controller of claim 10, comprising:

a transform unit configured to transform the demand torque generating voltage parameter and the demand flux generating voltage parameter to generate a stationary frame drive signal based on the estimated motor position.

12. The motor controller of claim 10, wherein:

the reference flux generating current parameter is less than zero.

13. The motor controller of claim 9, wherein:

the observer unit is configured to subtract a previous value of the estimated motor speed multiplied by a motor inductance parameter and the feedback torque generating current parameter from the feedback flux generating current parameter multiplied by a motor resistance parameter to determine the feedback flux generating voltage parameter.

14. The motor controller of claim 9, wherein:

the observer unit is configured to subtract the feedback flux generating voltage parameter from a demand flux generating voltage parameter to generate an error signal; and the observer unit comprises a controller configured to determine the estimated motor speed based on the error signal.

15. The motor controller of claim 9, wherein:

the controller comprises a proportional-integral controller.

16. The motor controller of claim 9, wherein:

the observer unit comprises an integrator configured to integrate the estimated motor speed to determine the estimated motor position.

17. The motor controller of claim 9, wherein:

the observer unit is configured to subtract the feedback flux generating voltage parameter from a demand flux generating voltage parameter to generate an error signal; and the observer unit comprises a proportional-integral controller configured to generate the estimated motor speed based on the error signal.

18. A method for controlling a motor comprising:

receiving a three-phase motor current measurement;

transforming the three-phase motor current measurement to generate a feedback torque generating current parameter and a feedback flux generating current parameter;

generating an estimated motor speed parameter and an estimated motor position parameter using an equation comprising the feedback torque generating current parameter, the feedback flux generating current parameter, a motor resistance parameter, and a motor inductance parameter as operands;

generating a drive signal for the motor based on a demand speed parameter and the estimated motor speed parameter;

transforming the drive signal based on the estimated motor position parameter to generate a stationary frame drive signal; and controlling a pulse width modulator coupled to the motor based on the stationary frame drive signal.

19. The method of claim 18, wherein:

generating the drive signal comprises:

generating a demand torque generating current parameter based on the demand speed parameter and the estimated motor speed parameter;

generating a demand torque generating voltage parameter based on the demand torque generating current parameter and the feedback torque generating current parameter;

generating a demand flux generating voltage parameter based on a reference flux generating current parameter and the feedback flux generating current parameter; and generating the drive signal based on at least one of the demand torque generating voltage parameter or the demand flux generating voltage parameter; and generating the estimated motor speed parameter and the estimated motor position parameter comprises generating the estimated motor speed parameter and the estimated motor position parameter based on the demand flux generating voltage parameter.

20. The method of claim 19, wherein:

the reference flux generating current parameter is less than zero.

* * * * *